(12) United States Patent
Schaedler

(10) Patent No.: US 6,460,670 B2
(45) Date of Patent: Oct. 8, 2002

(54) CLUTCH FOR BLADE ENGAGEMENT

(75) Inventor: Axel Schaedler, Medina, OH (US)

(73) Assignee: MTD Products INC., Cleveland, OH (US)

( * ) Notice: Subject to any disclaimer, the term of this patent is extended or adjusted under 35 U.S.C. 154(b) by 24 days.

(21) Appl. No.: 09/770,872

(22) Filed: Jan. 26, 2001

(65) Prior Publication Data

US 2001/0025757 A1 Oct. 4, 2001

Related U.S. Application Data

(60) Provisional application No. 60/178,657, filed on Jan. 28, 2000.

(51) Int. Cl.[7] ........................... F16D 67/04; F16D 67/02
(52) U.S. Cl. .................... 192/18 A; 56/11.3; 192/18 R; 192/85 V; 192/99 S
(58) Field of Search ......................... 192/14, 16, 18 R, 192/18 A, 85 V, 995; 56/11.3

(56) References Cited

U.S. PATENT DOCUMENTS

| 3,841,449 A | | 10/1974 | Coffey et al. ............... 192/3.59 |
| 4,122,652 A | | 10/1978 | Holtermann .................. 56/11.3 |
| 4,205,509 A | * | 6/1980 | Miyazawa et al. ............. 192/14 |
| 4,226,313 A | | 10/1980 | Meldahl et al. ........... 192/18 R |
| 4,320,822 A | | 3/1982 | Meldahl et al. ........... 192/18 R |
| 4,322,935 A | | 4/1982 | Poehlman ..................... 56/11.3 |
| 4,466,233 A | | 8/1984 | Thesman ...................... 56/11.3 |
| 4,485,904 A | | 12/1984 | Udono et al. | |
| 4,570,766 A | * | 2/1986 | Golobay .................... 192/18 R |
| 5,119,918 A | * | 6/1992 | Pardee .......................... 56/11.3 |
| 5,165,510 A | | 11/1992 | Lunati ......................... 192/105 |
| 5,411,122 A | | 5/1995 | Uphaus | |
| 5,499,705 A | | 3/1996 | Ide .............................. 192/107 |
| 5,526,635 A | | 6/1996 | Wilder, Jr. .................... 56/11.3 |
| 5,570,765 A | | 11/1996 | Patridge ....................... 192/18 |
| 5,797,251 A | | 8/1998 | Busboom ...................... 56/11.3 |
| 5,918,449 A | | 7/1999 | Rush et al. ................... 56/10.8 |
| 5,971,121 A | | 10/1999 | Pardee ....................... 192/18 B |

FOREIGN PATENT DOCUMENTS

| FR | 2432118 | | 2/1980 |
| GB | 738734 | * | 10/1955 |

OTHER PUBLICATIONS

Notification of Transmittal of International Search Report dated Jun. 27, 2001.
International Search Report.

* cited by examiner

Primary Examiner—Rodney H Bonck
(74) Attorney, Agent, or Firm—Emerson & Skeriotis; Roger D. Emerson; Timothy D. Bennett

(57) ABSTRACT

A clutch-brake assembly for a mower includes a housing, a shaft rotatably connected to a prime mover, a clutch plate operatively received onto the shaft, a brake ring and a pulley of which the pulley is selectively engageable with the clutch pad or brake ring. An actuator, that may be a vacuum actuator, applies equal and opposite forces to disengage the brake ring and engage the clutch plate, which in affect allows for the transmission of rotational power from the shaft to the pulley.

22 Claims, 6 Drawing Sheets

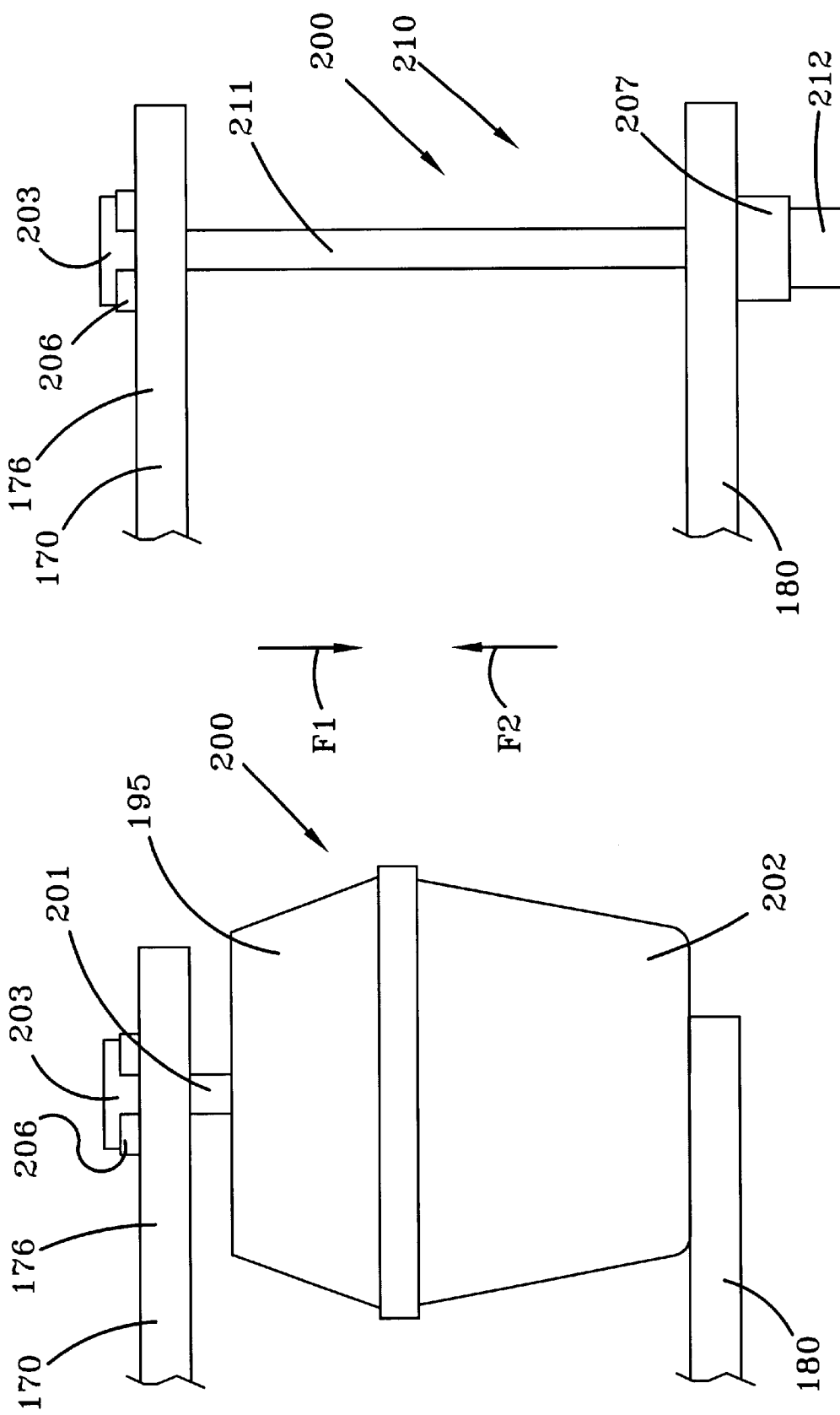

CLUTCH FOR BLADE ENGAGEMENT

This Utility Application claims priority from Provisional Patent Application Ser. No. 60/178,657 filed Jan. 28, 2000.

BACKGROUND OF THE INVENTION

1. Field of Invention

This invention relates to the art of clutches, and more specifically clutches incorporating brakes, especially as related to lawn care devices.

2. Description of the Related Art

Clutch brake mechanisms are well known in the art of lawn care equipment to be used to engage and disengage a pulley —such as a pulley used to drive (usually rotate) one or more cutting blades. Typically such clutches include a shaft rotatably actuated by a prime mover, such as an engine working through a pulley-belt system or other power transferring device. The shaft usually includes a disk, sometimes referred to as a clutch plate, having an aperture fashioned within the center within which is received the shaft. The disk is connected so that it rotates with the shaft. A friction material or pad may be adhered or fastened to one or both faces of the clutch plate. A second item, usually a pulley, is disposed in proximity to the clutch plate for selective engagement therewith. While the clutch plate is engaged with the pulley, rotational power is transferred from the clutch plate to the pulley, which may be operatively connected to a subsequent device (such as a mower deck having one or more blades for cutting vegetation). Upon disengaging the clutch plate from the pulley, a braking mechanism may be incorporated that arrests the motion of the pulley.

Typically such clutches are of two general types—electric clutches and mechanical clutches. Both types are useful for their intended purpose. However, both types also have problems. Common problems with electric clutches include the fact that that they are relatively expensive and that they may create a sudden, strong shock when they are activated. Such shocks may reduce the life of some lawn care equipment components. Common problems with mechanical clutches include the number and weight of components required to form the clutch/braking mechanism. Often belt keepers, pivoting idler pulleys and other components are necessary.

One clutch/brake assembly is described in U.S. Pat. No. 5,570,765 to Patridge. Partridge discloses a clutch/brake assembly for a machine having a rotating output shaft and a fixed mounting plate which includes an input disc, an output disc having a high friction pad and a brake member. A cam assembly is provided to be coupled with the input disc and moveable between first and second positions. Partridge further discloses that upon movement of the cam assembly from a second position to a first position, the input disc is moved out of engagement with the high friction pad and into engagement with the brake member.

Another clutch/brake device is described in U.S. Pat. No. 5,033,595 to Pardee. Pardee discloses a clutch/brake unit having a braking element that applies a brake and disengages a clutch when shifted axially in response to turning of a rotary actuator in one direction. The patent further discloses that the braking element includes balls and grooves formed in a flange so that the braking element is shifted downward by rotation of an actuator and the camming action of the balls.

What is needed is a mechanical clutch-brake that reduces the number of parts that make up the clutch-brake mechanism. By simplifying the construct of the assembly both the manufacturing and repairing of the unit is simplified, saving time and material cost.

SUMMARY OF THE INVENTION

One objective of the present invention is to provide clutch-brake assembly having an actuating means operatively connected to the brake member, also referred to as the brake ring, and the lever for applying a displacement force relative only to the brake member and the lever.

It is yet another object of the present invention to provide a clutch-brake assembly actuated by a vacuum actuator.

It is still yet another object of the present invention to provide a clutch-brake assembly having a brake member pivotally connected to a housing member.

According to the present invention there is provided a clutch-brake assembly having a concave housing member, a shaft operatively connected thereto and a clutch plate operatively received onto the shaft for rotation therewith. Leaf springs are attached at one end to a shoulder of the shaft and at a second end to the clutch plate so as communicate rotational power thereto. Additionally the leaf springs facilitate axial displacement of the clutch plate by allowing deflection so that upon displacement of the clutch plate a friction pad, adhered to the lower surface of the clutch plate, may operatively engage a pulley member transferring rotational power from the shaft to the pulley member. A annular brake member or brake ring is included that is pivotally connected at one point along the ring with respect to the housing member. At the opposite side of the brake ring with respect to the pivotal connecting point, a braking friction pad is adhered thereto. Springs bias the brake ring into braking engagement with the pulley member.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 5 is a two-dimensional side view of the vacuum actuator.

FIG. 5a is a two-dimensional side view of the cable assembly.

DESCRIPTION OF THE EMBODIMENTS

Figure 1:
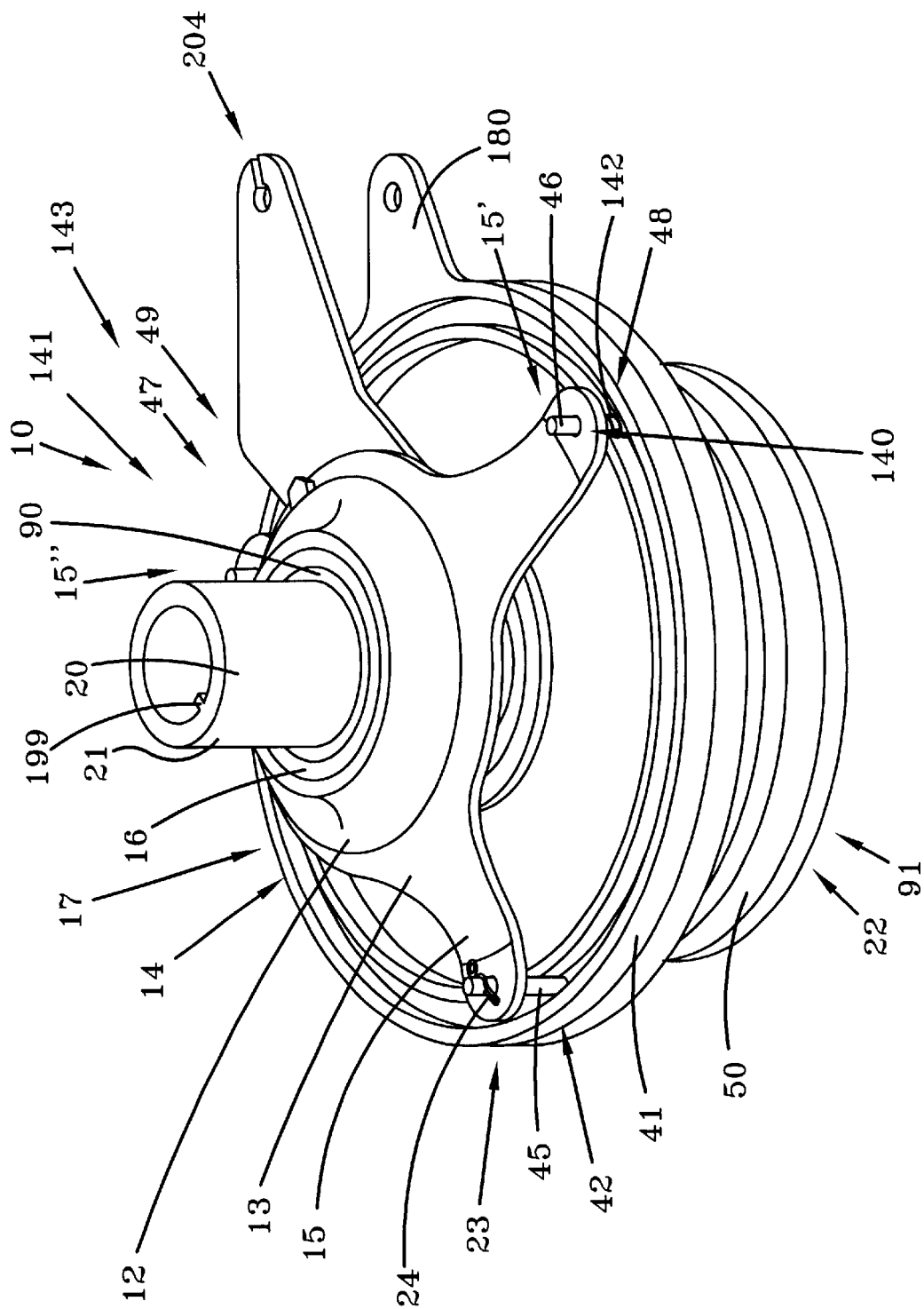
FIG. 1 is a perspective view of the clutch-brake assembly of the present invention.

Referring now to the drawings wherein the showings are for purposes of illustrating a preferred embodiment of the invention only and not for purposes of limiting the same, FIG. 1 depicts a clutch-brake assembly shown generally at 10. The embodiment described herein is directed to a clutch-brake assembly for use in engaging and disengaging a pulley operatively connected to one or more cutting blades on a lawn care device. Nonetheless, this invention is useful for other vehicles and other devices requiring selective engagement and braking of rotational power.

Figure 2:
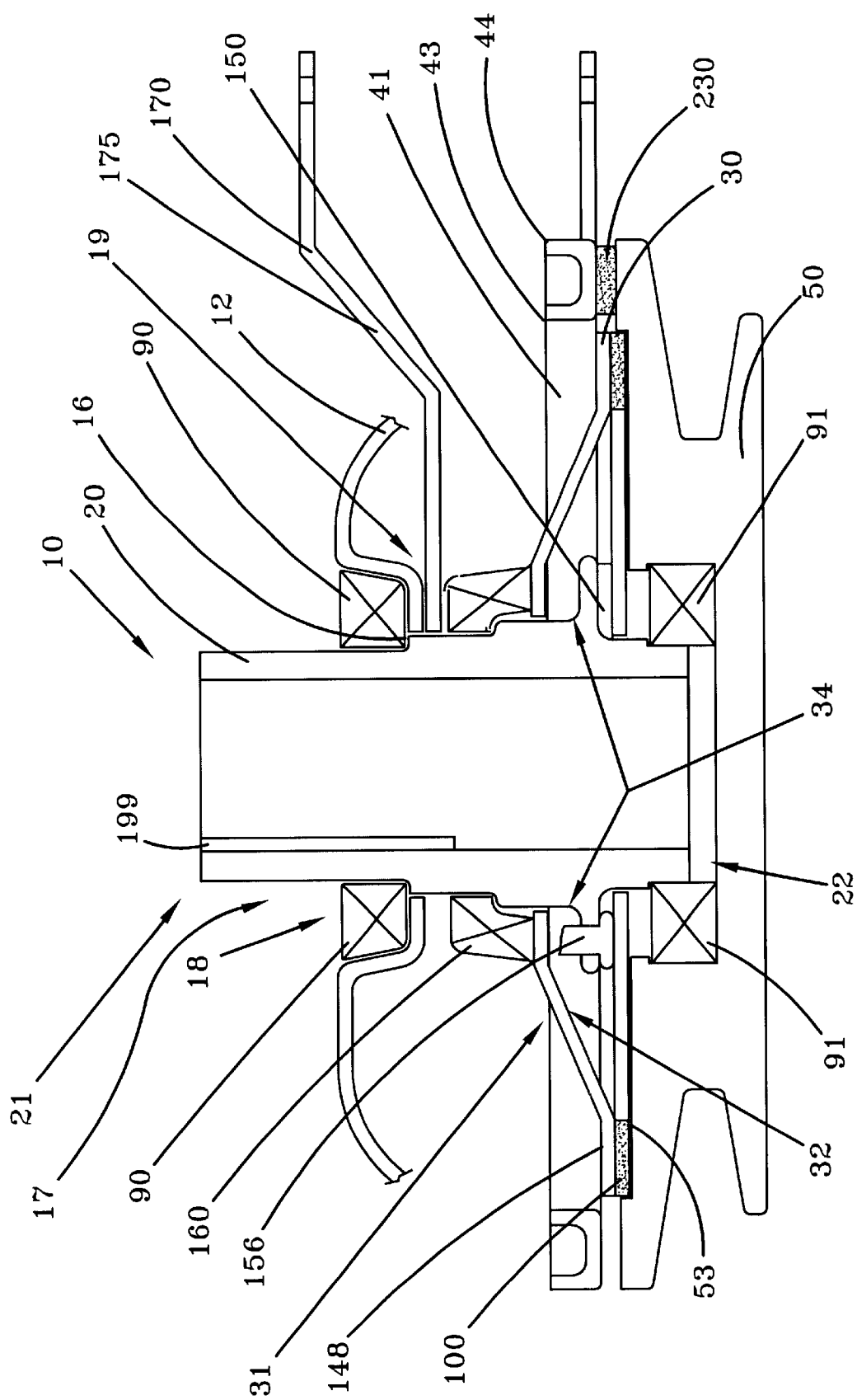
FIG. 2 is a cross sectional view of the clutch-brake assembly.

With reference now to FIGS. 1 and 2, the clutch-brake assembly 10 includes a frame or housing member 12 having first and second faces 13, 14. In the preferred embodiment, the clutch-brake assembly is attached to an associated output shaft of the mower engine via a bearing, not shown. As rotational power is transferred to the clutch-brake assembly 10, an anti-rotation device, not shown, is needed and included to prevent rotational movement of the housing member 12. The anti-rotation device can be any rigid member attached to a non-moving base, such as the vehicle frame, at one end and inserted axially through the housing member 12 at the other end. The housing member 12 is generally concave having three arm members shown at 15, 15' and 15" which extend radially outward from the center 17 of the housing member 12. A hole, shown at 16, is formed in the center 17 of the housing member 12 and is of sufficient diameter to receive a shaft 20. Bearing 90 rotatably and operatively communicates a first end 21 of the shaft 20 to the housing member 12. In this manner, the housing member 12 may be fixedly attached to the frame of a mower, not shown, while allowing the shaft 20 to rotate freely therein. The shaft 20 is adapted to receive rotational input from a prime driver, such as an engine. In the preferred embodiment, the shaft 20 is keyed for use in coupling with an output of the engine, not shown. In that keyed shafts and couplings are well known in the art no further explanation will be offered at this point. A pulley or pulley member 50 is shown opposite the housing member 12. Pulleys are well known in the art to receive a belt (not shown) for use in communicating power. For the embodiment shown, pulley member 50 is used to communicate power (using a belt) to one or more additional pulleys that are operatively connected to one or more cutting blades. Of course other implements could also be driven using this invention. In the preferred embodiment, the pulley member 50 is generally disk-shaped having a bore, not shown, fashioned in the center of the pulley member 50 for operatively attaching to a second end 22 of the shaft 20. Bearing 91 operatively connects the pulley member 50 to the shaft 20 so that the pulley member 50 is free to rotate with respect to the shaft 20. In that clutch mechanisms and bearings are well known in the art, no further explanation regarding the use of bearings will be provided at this point.

With reference now to FIG. 2, a cross section of the clutch-brake mechanism is shown. The housing member 12 is shown having a cup portion 18 fashioned substantially in the center 17 of the housing member 12 having therein formed the hole 16 for use in receiving shaft 20 as previously discussed. In the preferred embodiment, the housing member 12 is formed from a single piece of material, although any material and any means of constructing the housing member 12 may be chosen with sound engineering judgment. Bearing 90 resides at least partially within the cavity formed by the cup portion 18. In this manner, bearing 90 is disposed exterior to the housing member 12. Bearing 90 maintains a slip fit, of which such tolerances are well known in the art. However, neither the bearing 90 nor the shaft 20 may move axially with respect to housing member 12 or to a "world" frame of reference. In other words, the housing member 12 does not rotate or move axially.

With continued reference to FIG. 2, a lever 170 is shown juxtaposed to the housing member at 19. A detailed description of the lever 170 and the operation of the lever 170 will be provided in subsequent paragraphs. Disposed next to the lever 170 is a clutch plate 30. The center of the clutch plate 30 has an aperture 34 formed therein for receiving shaft 20. In the preferred embodiment, clutch plate 30 is generally concave having first and second sides 31, 32. The first side 31 of the clutch plate is disposed on the side of the lever 170, while the second side 32 of the clutch plate forms the concave region and faces away from the lever 170. A friction material member or pad 100 is fastened about the perimeter of the clutch plate 30 on the second side 32 in a manner well known in the art. However, any manner of fastening the friction pad 100 to the clutch plate 30 may be chosen with sound engineering judgment. In that friction pads and clutch mechanisms are well known in the art no further explanation will be offered.

With still continued reference to FIG. 2, disposed next to the friction pad 100 is pulley member 50. The pulley member 50 has a first surface 53 that is slightly larger than the outer diameter of the friction pad 100. As will be subsequently discussed, the clutch plate 30 is operatively connected to the shaft 20 so as to allow axial displacement of the clutch plate 30 such that the friction pad 100 may be brought into contact with the pulley member 50 at surface 53. Upon contact of the friction pad 100 with pulley member 50 and with the application of sufficient axial force, the clutch plate 30 will transfer rotational power from the shaft 20 to the pulley member 50. In this manner, the pulley member 50 is selectively engaged to cause synchronous rotation of the pulley member 50 with the shaft 20.

Figure 2A:
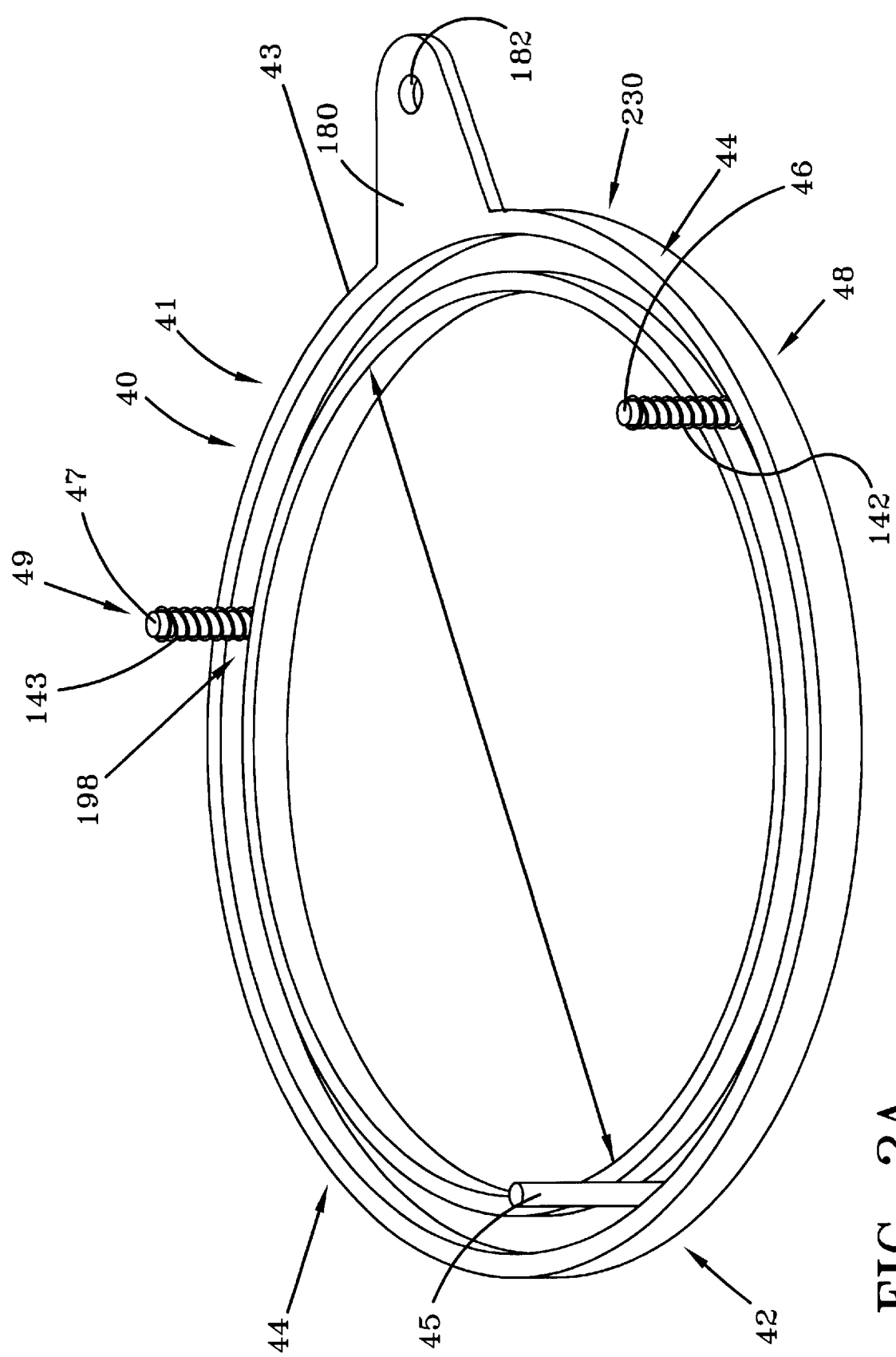
FIG. 2a is a perspective view of the brake member or brake ring.

With reference to FIGS. 1, 2 and 2a, a brake member 40 is shown fashioned in the shape of a ring and is consequently also referred to as a brake ring 41. Brake ring 41 has an inner diameter 43, an outer diameter 44 and a U-shaped cross-section, as can best be seen in FIG. 2. The brake ring 41 is positioned concentrically about the shaft 20 and the clutch plate 30 is disposed axially between the housing member 10 and the pulley member 50. In this manner, the brake ring 41 and the clutch plate 30 reside substantially in the same plane. At one position 42 along the circumference of brake ring 41, the brake ring 41 is pivotally attached to the housing member 12, at the arm member 15, shown in FIG. 1. The arm members 15, 15' and 15" are radially equidistance about the housing member 12, therefore any arm member 15, 15' or 15" may be chosen for pivotally connecting to the brake ring 41. A first pin 45 extends perpendicularly upward from the open side of the U-shaped brake ring 41 at position 42. In the preferred embodiment, the pin 45 may be welded in place to the brake ring 41. However, any means of attaching or extending the pin 45 to the brake ring 41 may be chosen with sound engineering judgment. Upon construction of the clutch-brake assembly 10, pin 45 is of sufficient length so as to protrude through a hole 23 fashioned in the arm 15 of the housing member 12, as shown in FIG. 1. A cotter pin 24 may be inserted into pin 45 to prevent pin 45 and the housing member 12 from separating during normal operation. A spacer, not shown, may be inserted between the bottom of the U-shaped brake ring 41 and the second face 14 of the housing member 12 at the arm member 15. In that the fastening of members together by use of cotter pins is well known in the art no further explanation will be offered at this point. Traveling about the circumference of the brake ring 41, second and third pins 46, 47 are disposed at positions 48 and 49, respectively, in a manner similar to that of pin 45. Positions 48 and 49 align with holes 140 and 141 fashioned in arm members 15' and 15" respectively, which are for use in receiving pins 48 and 49. The pins 48, 49 act as a guide while the brake ring 41 pivots about position 42. Coil springs 142, 143 are disposed concentrically about pins 48 and 49 and in between the arm members 15' and 15" and the bottom channel 198 of brake ring 41. In this way, coil springs 142, 143 bias the brake ring 41 downward, in that springs 142, 143 force against the non-moving housing member 12. Downward displacement of the brake ring 41 is limited by contact with pulley member 50, shown generally at 146. A friction member 230, shown best in FIG. 2, is fastened to the brake ring 41 in a manner consistent and well known in the art. The friction member 230 is arcuate in shape, and extends at least partially about the periphery of brake ring 41. The friction member 203 is attached to the bottom side of the brake ring 41 as indicated in FIG. 2a and clearly shown in FIG. 2. In this manner, brake ring 41 engages pulley member 50 via fiction member 203 on the same side as that of clutch plate 30. A ring force member 180 is also included and shown extending from the brake ring 41 opposite position 42 as shown in FIGS. 1 and 2a. The ring force member 180 may be fashioned on the brake ring 41 by any means chosen with sound engineering judgment. A bore 182 is fashioned within the ring force member 180 for use in fastening the ring force member 180 to a force applying actuator 200, which will be discussed in a subsequent paragraph. Any such means for attaching the ring force member 180 to the force applying actuator 200 may be chosen with sound engineering judgment. In the preferred embodiment, a threaded fastener is used to secure the force applying actuator 200 to ring force member 180.

Figure 3:
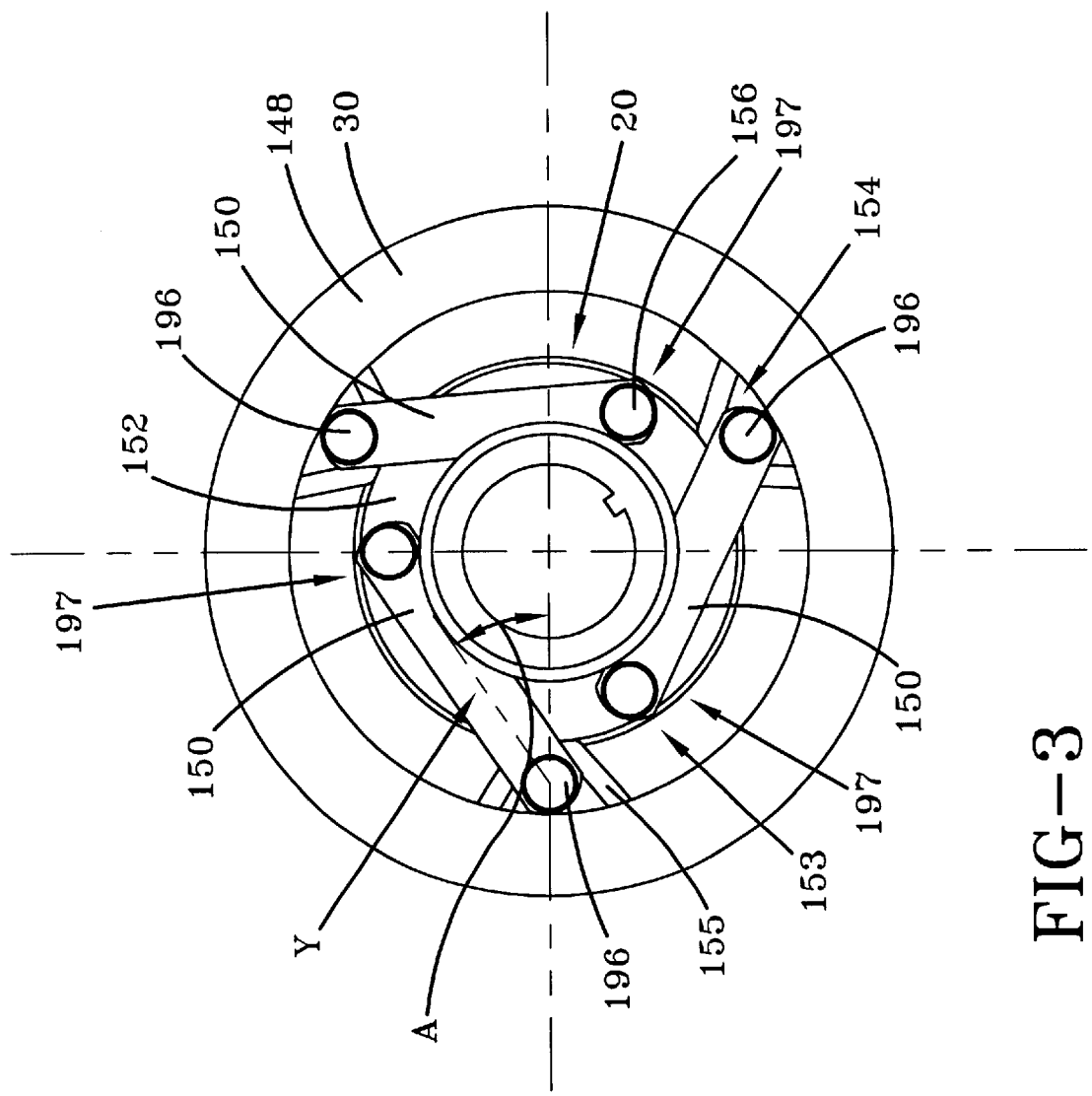
FIG. 3 is a bottom view of the clutch-brake assembly showing the leaf springs.

With reference to FIG. 3, leaf springs 150 are shown operatively connecting shaft 20 to clutch plate 30. While the number of leaf springs 150 shown in the preferred embodiment is three, any number of leaf springs 150 may be used in accordance with sound engineering judgment. With continued reference to the preferred embodiment, shaft 20 has a shoulder 152 extending outwardly from an outer surface of the shaft 20 and onto which is attached a first end 153 of the leaf springs 150. Any means of attaching the leaf springs 150 onto the shoulder 152 may be chosen with sound engineering judgment. However, in the preferred embodiment, rivots 156 are used to fasten the first end 153 of leaf springs 150 to the shoulder 152 of the shaft 20. Noted is the equidistant spacing of the connection points 197 about the periphery of the shoulder 152. The second ends 154 of leaf springs 150 are fixedly attached to clutch plate 30 via extension members 155. In a similar manner, rivets 196 are also used to secure the second ends 154 of the leaf springs 150 to the extension members 155. The extension members 155 may be any rigid operative extension of the clutch plate 30 as chosen with sound engineering judgment. In the preferred embodiment, the extension member and clutch plate are stamped from a single member. In other words, the extension members are integrally formed with the clutch plate. The leaf springs 150 are generally planar having a first longitudinal axis Y. In the preferred embodiment, the leaf springs 150 are oriented in such a way that the longitudinal axis, Y, of the leaf springs 150 form an acute angle A with respect to a center line axis of the shaft 20, as shown in FIG. 3. In this manner, the leaf springs 150 transmit rotational power from the shaft 20 for use in operatively rotating the clutch plate 30 in synchronous movement with the shaft 20. It is especially noted that with the use of leaf springs, the shaft may only rotate in a clockwise direction with respect to the bottom view of the clutch-brake assembly 10, as shown in FIG. 3 and designated by the arrow R. Leaf springs effectively communicate tension force, of which force the leaf springs 150 are under during rotation in this direction. Conversely, leaf springs do not effectively communicate compression force. Additionally, the leaf springs 150 are operatively attached so as to bias the clutch plate 30 out of engagement with the pulley member 50. As a result, the leaf springs 150 deflect, under sufficient force, allowing the outer periphery 148 of the clutch plate 30 to be selectively displaced toward engagement with the pulley member 50. Therefore, when no force is present to deflect the leaf springs 150, the clutch plate is disengaged from the pulley member 50. In that the function of leaf springs are well known, no further explanation will be offered at this point.

Figure 4:
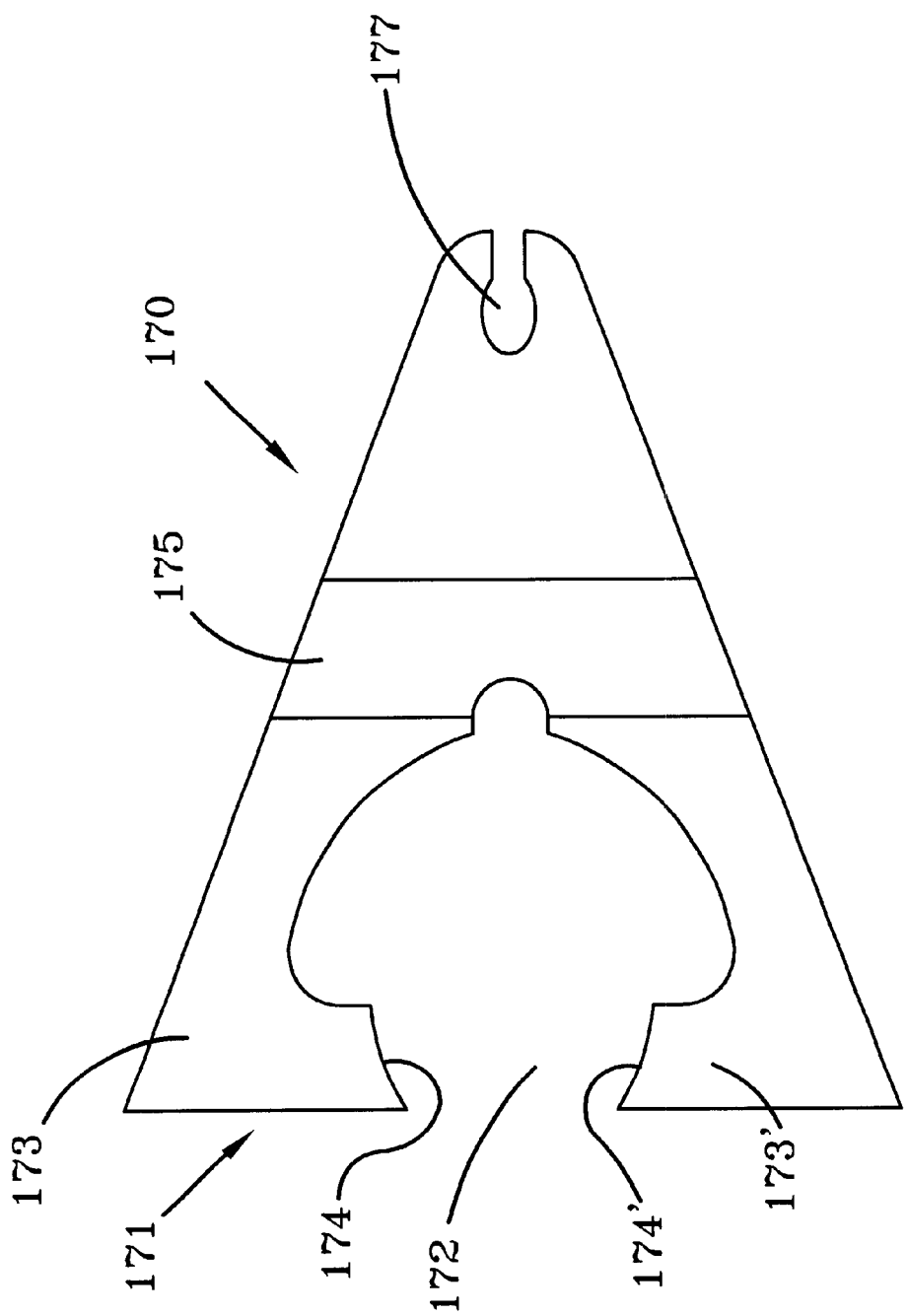
FIG. 4 is top view of the lever.

With reference to FIGS. 2 and 4, a lever 170 is disposed between the housing member 12 and a thrust bearing 160. In the preferred embodiment, the lever 170 has a forked end 171 with a single furcation 172 or space between two fingers 173, 173'. The ends 174, 174' of the fingers 173, 173' are semi-circular in shape and correspond to the contour of shaft 20, as can best be seen in FIG. 4. The lever 170 includes an upwardly angled portion 175. A second end 176 of the lever 170, opposite the forked end 171, includes an opening 177 which operatively connects the lever 170 to the force applying actuator 200 that applies an equal and opposite displacement force, which will be discussed subsequently. The forked end 171 of the lever 170 is received onto the shaft 20 and resides snugly between the housing member 12 and the thrust bearing 160, shown in FIG. 2. The thrust bearing 160 operatively transmits force, also referred to as a displacement force, from the lever 170 to the clutch plate 30 for use in displacing the clutch plate 30 into engagement with the pulley member 50. In that thrust bearings are well known in the art, no further explanation will be offered at this point. In the preferred embodiment, the biasing force of the leaf springs 150 provides a compression force or preload force upward through the clutch plate 30 and the thrust bearing 60 to compress the lever 170 against the housing member 12. In the preferred embodiment, the preload force is set at 20 pounds per square inch (psi). However, the preload force may reside in the range of 18 psi to 22 psi.

With reference to FIGS. 5 and 5a, a displacement force actuator is shown in FIG. 5 generally at 200. In the preferred embodiment, the displacement force actuator 200 is a vacuum actuator 195 having first and second portions 201, 202. In that the operation of vacuum actuators are well known in the art no explanation will be provided at this point. The first portion 201 of the vacuum actuator 195 may be cylindrical having a head portion 203. During assembly of clutch-brake 10, the first portion 201 of the vacuum actuator may slide through slot 204, which is fashioned within the second end of the 176 of the lever 170, as shown in FIG. 1. During operation of the clutch-brake assembly 10, the head portion 203 forces against the second end 176 of the lever 170 displacing the lever 170 downward consequently applying force to thrust bearing 160. The head portion 203 may be a threaded fastener operatively engaging a threaded region formed within the first portion 201 of the vacuum actuator 195. However, any means of forming a head portion 203 may be chosen with sound engineering judgment. A washer member 206 may be included as shown in FIG. 5 for operatively connecting first portion 201 to the second end 176 of the lever 170. FIG. 5a shows an alternate embodiment of the displacement force actuator 200. In this embodiment, a cable assembly 210 having a first cable portion 211 and a second sheath portion 212 defines the displacement force actuator 200. The first cable portion, similar to the preferred embodiment, includes a head portion 203. A washer member 206 may also included as previously described. In this embodiment, a ferrule member 207 may be included to facilitate the equal and opposite transfer of force to the clutch-brake assembly. In either embodiment, the displacement force actuator 200 applies a force F1 and F2 in the direction shown by the arrows in FIGS. 5 and 5a. The forces F1 and F2 are necessarily equal in magnitude and opposite in direction.

With reference now to FIGS. 1 through 5a, a description of the present invention will now be discussed. Operation of the clutch-bake assembly 10 includes rotary power from a prime mover such as an engine operatively communicated to the shaft 20 in a manner consistent with the previous discussion. In the de-energized state, brake ring 41 is prevented from rotational movement by the engagement of pins 46, 47 with the housing member 12. Coil springs 142, 143 bias the brake ring 41 downwardly with sufficient force so as to cause operative engagement of the friction member 203 with the pulley member 50. In the steady state condition, the pulley member 50 is at rest. Likewise the leaf springs 150, bias the clutch plate 30 and the friction pad 100 out of engagement with the pulley member 50. Upon actuation of the displacement force actuator 200, force F1 acts upon the second end 176 of the lever 170 pulling the lever 170 downward only. The force F1 is amplified by the moment arm of the lever 170 to the forked end 171 thereof, which acts downwardly upon thrust bearing 160. The amplified force F1 is transmitted through the thrust bearing 160 and the clutch plate 30 to deflect the leaf springs 150 so as to engage the friction pad 100 with the pulley member 50. In this manner, sufficient force from the actuator 200 is supplied to overcome the preload force of the leaf springs 150 and displace the clutch plate 30 and friction pad 100 into operative engagement with the pulley member 50. Upon engagement of the friction pad 100 with the pulley member 50, the pulley member 50 will accelerate to match the speed of the shaft 20. In this manner, rotational power may be transferred from the shaft 20 to the pulley member 50 affecting movement of an associated implement operatively attached to the pulley member 50. Simultaneous to the acting of force F1 upon the lever 170, force F2 acts equally and oppositely on the ring force member 180. This force F2 works against the coil springs 142, 143 causing upward pivotal movement of the brake ring 41. As brake ring 41 is displaced upwardly, the friction member 203 is disengaged from the pulley member 50 allowing the uninhibited transfer of power from the shaft to the pulley 50. In this manner, a displacement force actuator 200, vacuum actuator 195 or cable assembly 210 applies an equal and opposite displacement force relative only to the clutch plate 30 via lever 170 and to brake ring 41. It is noted that while the displacement forces F1 and F2 are equal in magnitude, the magnitude of displacement of the objects upon which the force F1 and F2 act upon, may vary due to the differences in the resistive forces generated by the springs 150 and 142, 143.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A clutch-brake assembly, comprising:

a housing member;

a shaft rotatably connected with respect to said housing member, said shaft adapted to receive rotational power from an associated power source;

a clutch plate operably received onto said shaft, said clutch plate adapted for selective displacement axially relative to said shaft;

a pulley member selectively rotatable with respect to said shaft, said pulley member having a first surface for use in operatively engaging said clutch plate;

a brake member selectively engageable with said pulley member for use in arresting motion of said pulley; and actuating means operatively connected to said clutch plate and said brake member, wherein said actuating means selectively applies a displacement force relative only to said clutch plate and brake member.

2. The clutch-brake assembly of claim 1, wherein said brake member is pivotally connected with respect to said housing member.

3. The clutch-brake assembly of claim 2, further comprising:

a biasing means for use in biasing said brake member into engagement with said pulley member.

4. The clutch-brake assembly of claim 3, wherein said biasing means includes at least a first guide pin extended from said brake ring, said at least a first guide pin operatively received by said housing; and, a spring in operable communication between said brake ring and said housing.

5. The clutch-brake assembly of claim 2, wherein said brake member is a brake ring, and further comprising:

a friction pad operatively attached to said brake ring at a distal end with respect to said pivotal connection.

6. The clutch-brake assembly of claim 1, wherein said actuating means comprises:

a force applying actuator having first and second portions, said first portion of said force applying actuator operatively connected to said brake member; and, a lever having first and second ends, said first end of said lever operatively disposed between said housing and said clutch plate, said second end of said lever operatively connected to said second portion of said force applying actuator.

7. The clutch-brake assembly of claim 6, wherein said first end of said lever is furcated, and wherein said shaft is received between the furcation of said first end.

8. The clutch-brake assembly of claim 7, wherein said force applying actuator is a vacuum actuator.

9. The clutch-brake assembly of claim 7, wherein said force applying actuator is a cable.

10. The clutch assembly of claim 1, further comprising:

a spring means operatively connected between said shaft and said clutch plate for use in biasing said clutch plate out of engagement with said pulley member, wherein said spring means translates rotational power from said shaft to said clutch plate.

11. The clutch-brake assembly of claim 10, wherein said spring means includes at least a first leaf spring.

12. The clutch-brake assembly of claim 11, wherein said shaft includes a shoulder extending outwardly from said shaft, and wherein said at least a first leaf spring is operatively fastened to said shoulder for use in preloading said clutch plate.

13. The clutch-brake assembly of claim 11, wherein said pulley member is fixedly attached with respect to axial displacement relative to said shaft.

14. A clutch-brake assembly, comprising:

a housing member;

a shaft rotatably connected with respect to said housing, said shaft adapted to receive rotational power from an associated power source;

a clutch plate operably received onto said shaft, said clutch plate adapted for selective displacement axially relative to said shaft;

a pulley member selectively rotatable with respect to said shaft, said pulley member having a first surface for use in operatively engaging said clutch plate;

a brake member selectively engageable with said pulley for use in arresting motion of said pulley; and a vacuum actuator operably connected to said clutch plate and said brake member.

15. The clutch-brake assembly of claim 14, further comprising:

a lever having first and second ends, said lever operatively connected at said first end to said clutch plate and at said second end to a first portion of said vacuum actuator.

16. The clutch-brake assembly of claim 15, wherein said lever is furcated at said first end, and wherein said shaft is received between said furcation of said first end of said lever.

17. The clutch-brake assembly of claim 16, wherein said vacuum actuator includes a second portion, wherein said second portion is operatively attached to said brake member.

18. The clutch-brake assembly of claim 17, wherein said brake member is pivotally connected at a first end with respect to said housing.

19. The clutch-brake assembly of claim 18, wherein said brake member includes at least a first guide pin extended from said brake member, said guide pin operatively received by said housing, and a spring operatively connected between said brake member and said housing.

20. The clutch-brake assembly of claim 19, wherein said brake member includes a friction pad operatively connected at a distal end of said brake member with respect to said pivotal connection.

21. The clutch-brake assembly of claim 15, further comprising:

at least a first leaf spring operatively connected between said shaft and said clutch plate for use in biasing said clutch plate out of engagement with said pulley member and for use in preloading said clutch plate.

22. The clutch-brake assembly of claim 21, wherein said shaft includes a shoulder extended from an outer surface to which said at least a first leaf spring is operatively connected, and wherein said at least a first leaf spring transmits rotational power from said shaft to said clutch plate.

* * * * *